Jan. 11, 1938.　　　F. H. RAUH　　　2,105,332
BUMPER FOR HEDGE SHEARS
Filed Aug. 14, 1937
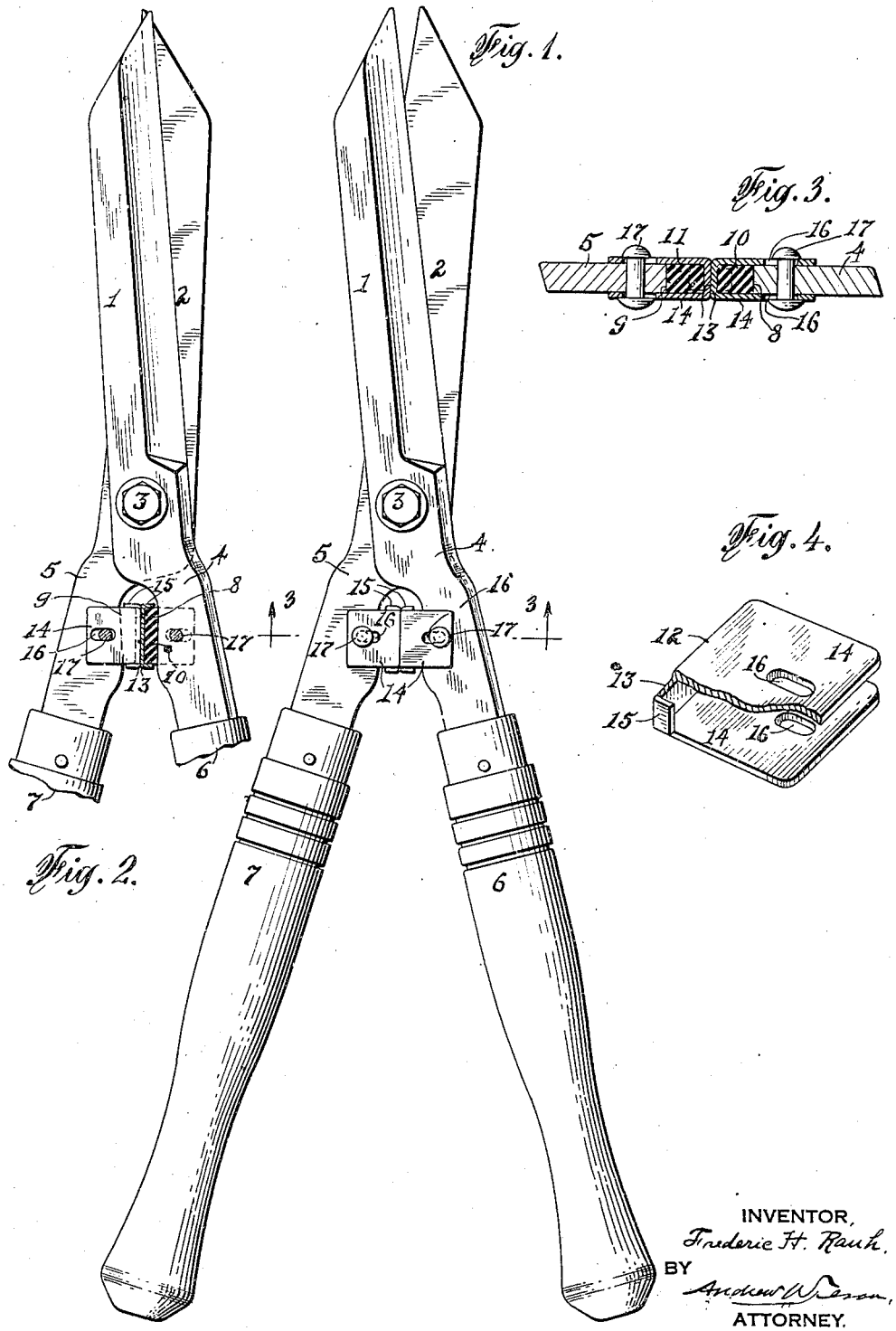
INVENTOR,
Frederic H. Rauh.
BY
ATTORNEY.

Patented Jan. 11, 1938

2,105,332

UNITED STATES PATENT OFFICE 2,105,332

BUMPER FOR HEDGE SHEARS

Frederic H. Rauh, South Orange, N. J., assignor to J. Wiss & Sons Co., Newark, N. J., a corporation of New Jersey Application August 14, 1937, Serial No. 159,055

3 Claims. (Cl. 30—271)

My invention relates to comparatively large and heavy hand operated shears, such, for instance, as are commonly used for trimming hedges, shrubbery and the like.

Objects of my invention are to provide improved means for taking up the jar or shock occasioned by completely closing the shears; to do this by using an improved type of cushioning means to absorb the shock occasioned by completely closing the shears; to distribute the shock over a considerable area of the cushioning means; to distribute the shock progressively longitudinally of the cushioning means; to protect the compressible element of the cushioning means by metal shields; to make such shields slidable and swingable in relation to anchoring pivots; and to secure the other advantageous features hereinafter pointed out and claimed.

In the drawing Fig. 1 is a plan view of a pair of shears embodying my improvements, the blades not being fully closed; Fig. 2 is a plan view of the same, the handles being broken off to save space and the blades being fully closed, one of the shock absorbers being shown partially in section; Fig. 3 is a cross sectional view taken, on an enlarged scale, on the line 3—3 of Fig. 1, looking up; and Fig. 4 is a perspective view, partially broken away for clearness, of one of the metal shields.

Similar reference numerals designate similar parts in all the figures.

In the use of shears of this general type, for instance for trimming hedges, the action of the cutting edges proceeds more or less irregularly due to the variation of resistance caused by larger and smaller elements in the growth being trimmed. If that growth is soft and comparatively uniform, the shears will move readily to their completely closed position, and will be arrested there with a substantial shock; and if the movement is more or less irregular due to the unequal resistance of the growth being cut, the shock may be considerably increased when, for instance, a comparatively large shoot is severed near the end of the cut, so that the blades will jump to a quick closing.

Owing to the position in which such shears are commonly held in the operator's hands, particularly when raised somewhat, as to trim the flat top of a hedge, there is a substantial element of strain in the wrists and forearms of the operator, rendering the muscles and nerves peculiarly susceptible to closing shocks in the shears. It is to diminish these objectionable shocks that my improvements are directed.

In the drawing I have shown a pair of hedge shears of a conventional type, except as to the features to which my invention is directed. These shears consist of a pair of blades 1 and 2 pivoted to each other as by a pivot 3 and extended, respectively, into shanks 4 and 5, provided with conventional handles 6 and 7.

The inner edges of these shanks have approximately straight edges 8 and 9, which are substantially parallel to each other when the shears are in the position shown in Fig. 1.

Against each of these edges 8, 9 I place elongated blocks of rubber 10 and 11, which are substantially in the shapes of parallelograms; and I inclose these rubber blocks in sheet metal shields 12, 12, which have faces 13, 13 extended into wings 14, 14 adapted to receive the shanks 5 and 4 between them, in a slidable relation. The faces 13, 13 have at their ends bent-over flanges 15, 15 adapted to receive the rubber blocks 10 or 11 between them, so as to prevent longitudinal sliding of the blocks.

The wings 14, 14 are provided with slots 16, 16, through which and through the shanks pass bolts or rivets 17, 17 which are provided with suitable heads or other keepers to prevent their ready withdrawal from the shanks.

When the rubber blocks are placed within the shields and the latter are assembled on the shanks, the faces 13, 13 of the shields will meet normally, as shown in Fig. 1, with the rubber in its uncompressed condition and the rivets toward the outer ends of the holes 16, 16. If then the handles 6, 7 are pressed toward each other the ends of the rubber blocks distant from the pivot 3 will be compressed more rapidly than their opposite ends, to compensate for which the shields can rock somewhat on their pivots so that their faces 13, 13 may continue in contact, and the shields may adjust themselves to the changed shape of the rubber blocks as the compression is continued by the closing of the shears, the shields sliding outward on the rivets as illustrated in Fig. 2. This movement continues until the resistance of the rubber is sufficient to stop the closing of the shears; and it will be noted that the movement need not be carried to the point of a positive arrest but may be discontinued when the closing of the blades has progressed sufficiently to accomplish the desired result of the particular cut being made. The movement of the shock absorber then is substantially such that the faces of the shields are in continuous contact from the time when the shock absorber begins to function, and continue in contact until it has served its duty in the particular cut.

This construction protects the rubber cushion against local abrasion and wear such as would be present if metal shields were not used; it also gives the yielding rubber blocks a considerable area of resistance between the shanks and the faces of the shields thereby permitting the use of a softer and more yielding rubber than would be permissible if the rubber elements were of substantially less size. This feature adds to the softness of the shock absorber, and diminishes the jar to the hands and arms of the user. The metal shields, also, act to protect the yieldable rubber from injury or displacement by the stubs of the growth which is being cut by the shears in use, and eliminate the danger of interference with the normal functioning of the rubber cushion.

I wish it to be understood that the details of the shock absorber which I have illustrated may be somewhat modified as by the use of mechanical equivalents without departing from the spirit of my invention as claimed.

Having thus described my invention what I claim and desire to secure by Letters Patent of the United States is:—

1. The combination, between the shanks of a pair of shears of a pair of yieldable rubber cushions, inclosed within metal shields, said shields being slidably and swingably mounted upon the shanks.

2. The combination, between the shanks of a pair of shears of a pair of yieldable rubber cushions, inclosed within metal shields, said shields being provided with slots through which pass pins set in the shanks so that the shields are mounted slidably and swingably upon the shanks.

3. The combination between the shanks of a pair of shears of a bumper embodying a yieldable rubber cushion inclosed within a metal shield slidably and swingably mounted on one shank, and cooperating bumper opposing-means on the other shank.

FREDERIC H. RAUH.